Aug. 9, 1960 K. W. SMITH 2,948,112
COMBINED ROCKET AND RAM-JET ENGINE
Filed Dec. 14, 1953 2 Sheets-Sheet 1
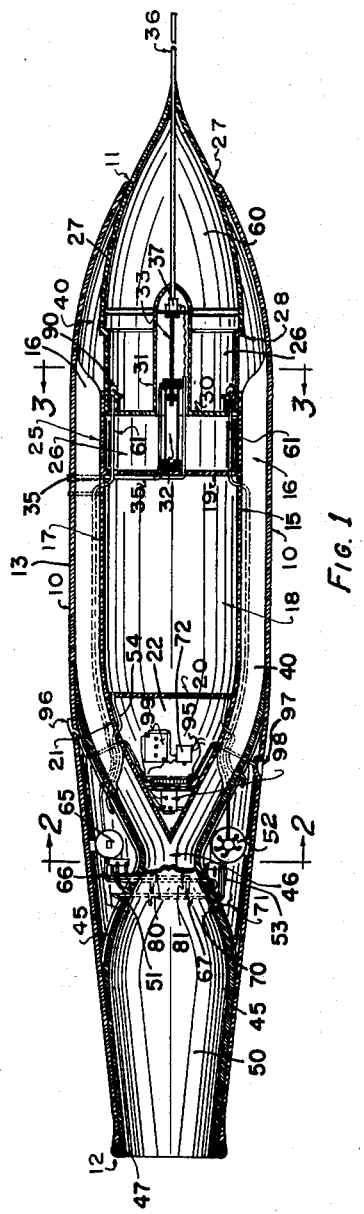
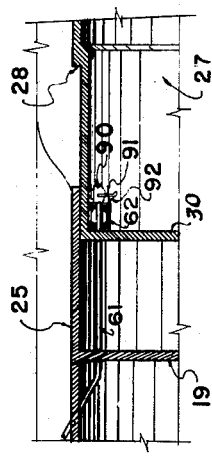
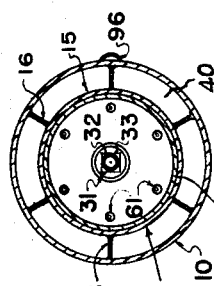
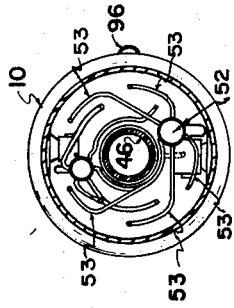
KENNETH W. SMITH
INVENTOR.
BY
ATTORNEY Aug. 9, 1960                K. W. SMITH                2,948,112
              COMBINED ROCKET AND RAM-JET ENGINE
Filed Dec. 14, 1953                              2 Sheets-Sheet 2
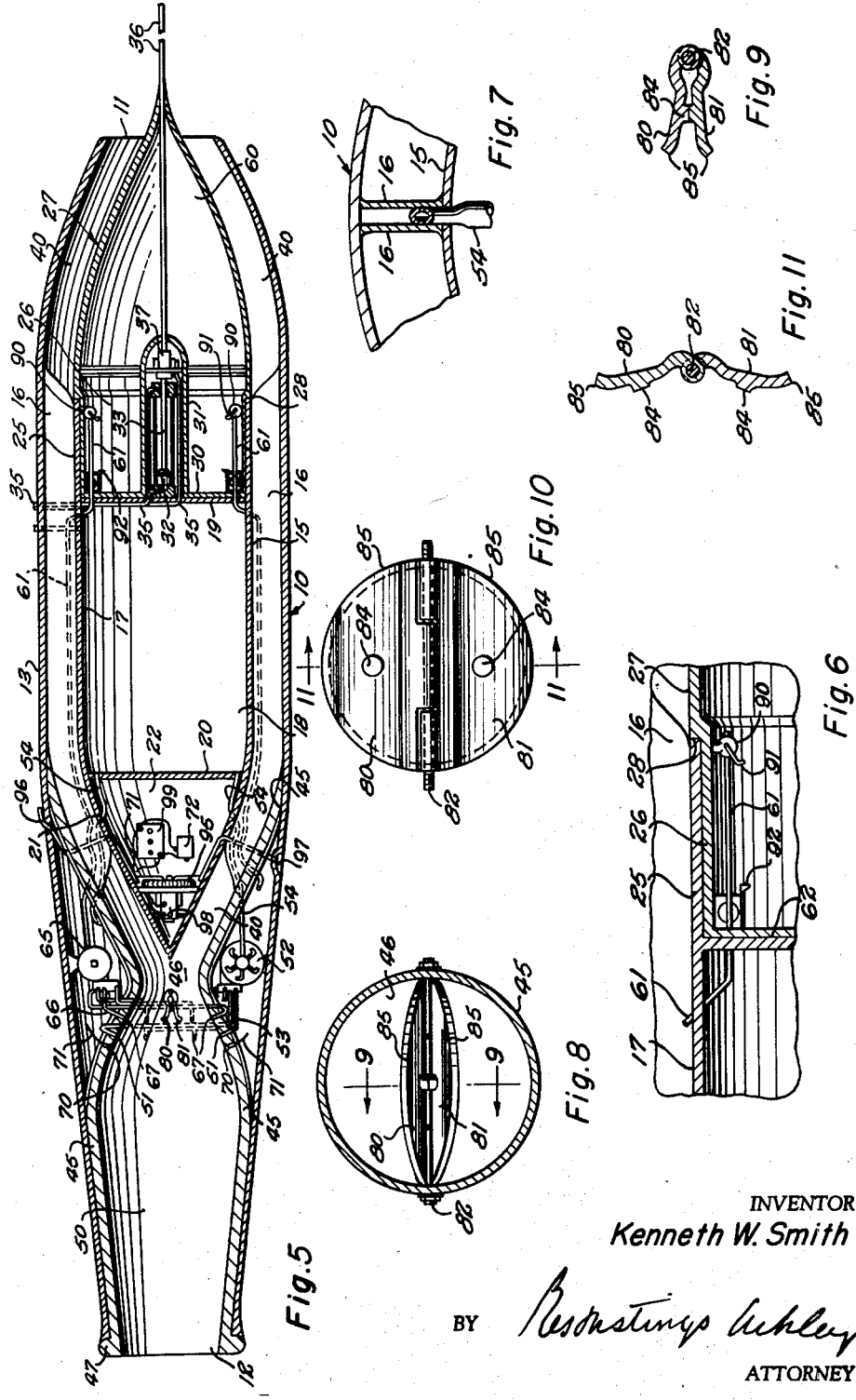
INVENTOR
Kenneth W. Smith
BY
ATTORNEY

United States Patent Office 2,948,112
Patented Aug. 9, 1960

2,948,112

COMBINED ROCKET AND RAM-JET ENGINE

Kenneth W. Smith, 519 S. Edgefield St., Dallas, Tex.

Filed Dec. 14, 1953, Ser. No. 397,886

3 Claims. (Cl. 60—35.6)

This invention relates to new and useful improvements in power plants, and more particularly to an engine convertible from rocket to ram-jet propulsion or from ram-jet to rocket propulsion while in flight.

It is a particular object of the invention to provide a combination rocket and ram-jet engine which is designed to operate by means of rocket propulsion until a suitable speed has been attained and which is then convertible to ram-jet propulsion.

Another object of the invention is to provide an engine, of the character described, wherein the conversion from one type of propulsion to the other is accomplished automatically under predetermined conditions of air flow or pressure, or both.

A particular object of the invention is to provide, in a power plant of the character described, novel valve or control means for converting the power plant from rocket to ram-jet propulsion, or from ram-jet to rocket propulsion, and wherein such valve or control means is operable automatically by air flor or pressure, or both.

Still another object of the invention is to provide an engine or power plant of the character described wherein the means for controlling the operation of converting the power plant from one style of propulsion to another is controllable at will, rather than automatically.

A particular object of the invention is to provide a power plant of the character described which is particularly adapted for use as an engine for aircraft operating in the ram-jet stage, to provide means for maintaining flight should a "flame-out" occur while in flight in the ram-jet stage, by providing an automatically operable rocket propulsion means for maintaining flight and for attaining the speed necessary for ram-jet propulsion.

Additional objects and advantages of the invention will be readily apparent from the reading of the following description of devices constructed in accordance with the invention, and reference to the accompanying drawings thereof, wherein:

Figure 1 is a longitudinal sectional view of the power plant showing the same in rocket propulsion stage, Figures 2 and 3 are cross sectional views taken on the line 2—2 and 3—3 of Figure 1, Figure 4 is an enlarged fragmentary view of the fuel line and valve from the oxygen tank, showing the same in open position for rocket operation, Figure 5 is a longitudinal sectional view, similar to Figure 1, showing the power plant in the ram-jet propulsion stage, Figure 6 is an enlarged fragmentary view, similar to Figure 4, showing the flow line and valve from the oxygen tank in the closed position during ram-jet propulsion, Figure 7 is an enlarged fragmentary section through one of the vanes between the outer shell and the fuel tank, showing the manner in which the fuel and other flow lines are disposed in such vanes, Figure 8 is an upstream view of the flap valves at the entrant end of the combustion chamber, Figure 9 is a vertical sectional view taken on the line 9—9 of Figure 8, Figure 10 is a downstream view of the flap valves of Figure 8 showing the same in closed position, and Figure 11 is a vertical sectional view taken on the line 11—11 of Figure 10.

In the drawings, the numeral 10 designates an elongated tubular body or shell of the power plant having an entrant or nose opening 11 at one end and an outlet or tail opening 12 at the opposite end. The central portion 13 of the body is substantially cylindrical, and at the nose end the body is gradually convergent to the nose opening, while at the rear end the body likewise tapers to the reduced outlet opening.

Mounted coaxially of the central portion of the body is a housing 15, which is maintained in such coaxial position by means of a plurality of longitudinally extending substantially radially disposed fins or supporting vanes 16 spaced uniformly about the periphery of the housing. The housing includes a cylindrical central portion 17 providing a fuel tank 18 defined by a front bulkhead 19 and a rear bulkhead 20. The rear portion 21 of the housing is preferably substantially conical in shape, and the interior thereof defined by the rear bulkhead 20 provides an electrical system housing 22 for receiving the battery, generator, ignition system, and the like. The details of the electrical system will be hereinafter more fully explained.

At the forward end of the housing is a cylinder 25 into which telescopes the rear cylindrical piston portion 26 of a longitudinally movable nose valve member 27, which may have at its forward end any desired substantially conical shape required for satisfactory operation at the speed for which the power plant is designed.

The portion of the nose member just forward of the piston portion 26 is slightly enlarged in diameter to substantially that of the cylindrical portion 17 of the housing to provide a shoulder 28 which is designed to abut the forward end of the cylinder 25 to limit rearward movement of the nose member in the cylinder and in the body 10. The rear end of the piston 26 of the nose member is provided with a closure wall 30 having an axially disposed cylindrical casing 31 extending forwardly from the rear wall toward the forward end of the nose member. The casing 31 receives and telescopes over a servo-mechanism 32 connected by means of a push rod 33 with the forward end of said casing, whereby axial movement of the nose member may be obtained by actuation of the servo-mechanism to move the nose member to the forward closed position shown in Figure 1 or to the rearward open position shown in Figure 5, as desired.

The servo-mechanism 32 may be electrically operated, or may be fluid operated, as by the hydraulic system of an aircraft on which the power plant is mounted, and is shown as being hydraulically operated and having fluid lines 35 communicating with the servo-mechanism and extending outwardly through one of the vanes 16 to the exterior of the body or shell and thence to the hydraulic system of the aircraft. A pitot tube 36 extends axially forwardly from the casing 31 to the exterior of the nose valve member 27 whereby the pressure change due to changes in speed of movement of the power plant through the air may be utilized to operate a switch mechanism 37 which controls the operation of the servo-mechanism. Thus, under a low pressure condition due to relatively low speed, the switch mechanism 37 would be operated to direct fluid to the servo-mechanism to project the nose valve member forwardly to the position shown in Figure 1 where it closes the entrant opening 11 to the body 10 of the power plant. Conversely, a high pressure condition, due to high speed, would operate the switch 37 to actuate the servo-mechanism to retract the nose valve member 27 to the open position shown in Figure 5.

It will therefore be seen that the nose valve member 27 is movable from a position closing of the inlet or entrant end 11 of the body of the power plant to a retracted position in which the inlet end is open. It will also be obvious that the pitot tube and servo-mechanism arrangement provide means for automatically accomplishing such movement of the nose valve member upon the occurrence of predetermined conditions of air flow or pressure, or both, as related to speed of the power plant through the air. Obviously, the actuation of the servo-mechanism may be controlled by a valve means (not shown) at a remote point in the fuel supply line 35 in an aircraft on which the power plant is mounted.

The conformation of the nose valve member 27 and of the cylindrical housing 15 conforms substantially to the configuration of the body or shell 10 of the power plant, the nose valve member and housing being uniformly smaller than and axially mounted in the body or shell, whereby an annular flow passage or conduit 40 is defined by such nose valve member and housing and the interior wall of the body. The exterior dimensions of the valve nose member also are substantially equal to the exterior dimensions of the cylindrical housing 15, whereby when the nose member is in the retracted position shown in Figure 5, said nose member forms a smooth continuation of the outer surface of the housing 15.

A flame and heat resistant lining 45 is provided in the rear portion of the body 10, extending from a point adjacent the rear portion of the cylindrical portion of the housing 15 and constricted rearwardly, in substantial conformity to the taper of the conical rear section 21 of the housing, to a throat 46 immediately to the rear and axially surrounding the tip of said conical portion of the housing. The liner is then flared from the throat 46 to engagement with the inner wall of the tapered rear end of the body 10 and is provided with a reinforcing ring 47 at its outer end defining the outlet or exhaust opening at the rear of the body. The enlarged portion of the liner rearwardly of the throat 46 provides a combustion chamber 50. A plurality of fuel injection nozzles 51 are provided at uniformly spaced ponits around the periphery of the combustion chamber just rearwardly of the throat 46. A fuel pump 52, which may be electrically operated, supplies fuel through conduits 53 to the nozzles 51, such pump drawing fuel from the fuel chamber or tank 18 in the housing 15 through lines 54 communicating with the tank through the rear bulkhead 20 and extending rearwardly through the vanes 16 in the manner shown in Figure 7. The pump and the fuel line connections are disposed in the annular space between the liner throat 46 and the shell 10, and electric lines leading to switches controlling operation of the fuel pump may be directed outwardly through the shell to any desired point for control of operation of the power plant.

The oxygen for combustion of the fuel in the chamber 50 may be supplied either by air flowing through the annular passage 40 between the housing 15 and the shell 10 or from a supply of liquid oxygen or the like contained under pressure in the chamber 60 formed in the nose valve member 27. The liquid oxygen may flow rearwardly from such chamber through one or more conduits 61 projecting through the bulkhead 19 and the rear wall 30, in the manner shown in Figures 4 and 6. A packing gland 62 surrounding the conduits just within the chamber 60 at the rear wall 30 prevents escape of the liquid oxygen through the rear wall otherwise than by passing outwardly through the conduits. The oxygen conduits extend rearwardly from the bulkhead 19 in selected ones of the vanes 16 to the annular space between the liner 45 and the shell 10, where the conductors communicate with a liquid oxygen pump 65 mounted in such annular space and operated by electricity or the like, for pumping such liquid oxygen through the conduit and then through the orifice manifold pipes 66 to jet nozzles 67 communicating with the interior of the combustion 50 just in advance of the fuel nozzles 51.

Ignition plugs 70 connected by wires 71 to the ignition system 72 in the electrical system housing 22 provide means for igniting the fuel and oxygen in the combustion chamber.

For rocket operation of the power plant, the throat 46 at the forward end of the combustion chamber 50 is closed by means of a pair of flap valve members 80 and 81, respectively, which are substantially semi-circular in configuration and are pivotally mounted on a transverse pin 82 extending diametrically across the liner 45 just rearwardly of the narrowest constriction of the throat 46. The flap valve members are arranged to move to the position shown in Figures 1, 10 and 11, wherein the peripheral edges of said flap valve members engage the inner wall of the throat just to the rear of the narrowest constriction and close the forward end of the combustion chamber. The explosive force of combustion of the fuel and liquid oxygen in the combustion chamber holds the flap valve members in such closed position and provides a forward thrust on the power plant, the blast of the combustion exhausted through the outlet opening 12 defined by the ring 47 driving the power plant forwardly through the air. For automatic movement of the flap valve members to open position, bosses 84 are provided on each of said flap members 80 and 81 and are disposed to engage each other in the manner shown in Figure 9 to hold the flap valve members separated, whereby the force of the blast of the combustion of the fuel and oxygen will separate the members and move them to the closed position, should they, at the time of such combustion, be in the open position shown in Figures 8 and 9. The outer portions of the edges of the flap valve members are also slightly inclined as shown at 85 to further assist this opening operation by the blast of the combustion in the combustion chamber.

For rocket operation, the nose valve member 27 is in the closed position shown in Figure 1, wherein such valve member contacts the inner periphery of the inlet opening 11 in the body or shell of the power plant. Thus, flow of air through the annular space 40 between the body and the housing 15 is shut off, and an oxidant in the form of liquid oxygen from the chamber 60 in the nose valve member must be pumped to the combustion chamber 50 to ignite and burn the fuel jetted into such chamber. In this phase or stage of the operation of the power plant, the flap valve members 80 and 81 move to the closed position shown in Figures 1 and 10, and the power plant provides rocket propulsion.

When a sufficient speed through the air has been attained, the pressure difference acting through the pitot tube 36 on the switch mechanism 37 sets the servo-mechanism 32 into motion, whereby such mechanism acts by means of the connecting or push rod 33 to draw the nose valve member 27 rearwardly, the piston portion 26 telescoping into the cylinder 25 at the forward end of the housing 15 to the position shown in Figure 5, where the shoulder 28 engages the forward end of the cylinder and limits further rearward motion of the valve nose member. In this position, the inlet opening 11 at the forward end of the body is open and the flow passage 40 between the nose member and housing 15 and the body 10 of the power plant is open to permit flow of air therethrough. The power plant then operates on the ram-jet principle, the compressed air flowing through the passage 40 moving rearwardly between the housing and the body 10 and between the conical rear portion 21 of the housing and the liner 45 to the throat 46, where it acts to move the flap valve members 80 and 81 to the open position shown in Figures 5 and 9, whereby the air so admitted supplies oxygen for combustion of the fuel injected through the nozzles 51.

When the various elements of the power plant are in the position shown in Figure 5, the plant is in the ram-jet stage, and will continue to operate in that stage until the speed of motion of the power plant through the air becomes so low that the pressure difference acting through pitot tube 36 actuates the switch 37 and causes the servo-mechanism to move the nose valve member 27 forwardly to the closed position shown in Figure 1, whereupon rocket operation of the power plant is resumed.

Obviously, when the nose valve member moves to the open position, and admits air through the flow passage 40, there is no longer need for a supply of liquid oxygen for combustion of the fuel in the combustion chamber. Therefore, a valve 90 is provided at the entrant end of the liquid oxygen fuel conduit 61, which valve has an actuating lever 91 arranged to engage a trip member 92 at the packing assembly 62 to open the valve when the valve nose member is in the closed position shown in Figure 1, whereby liquid oxygen may flow through the conduit. However, as soon as the nose valve member is moved rearwardly after adequate speed has been attained to actuate the servo-mechanism, the trip 92 moves out of engagement with the lever 91 and permits the valve to close and shut off further flow of liquid oxygen from the chamber 60 through the conduit to the pump 65. Simultaneously, the trip 92 actuates a switch which automatically cuts off the flow of power to the pump 65 and all flow of oxygen through the nozzles 67 is thus discontinued during the ram-jet stage of operation.

However, should the speed of movement of the power plant through the air be insufficient to maintain ram-jet operation, the pressure difference acting through the pitot tube on the switch 37 will actuate the servo-mechanism 32 to move the nose valve member 27 to the closed position. In this position, the valve 90 is again opened and the switch controlling electric current through the motor is again closed, whereupon the supply of liquid oxygen from the nose chamber 60 to the combustion chamber 50 is renewed and rocket operation is resumed. Thus, should a "flame-out" occur during ram-jet operation, and the speed of the power plant through the air decrease sufficiently, the automatic actuation of the nose valve member and the switches controlling the flow of liquid oxygen to the combustion chamber will take place and set the power plant into operation for rocket propulsion, in the manner just described.

If desired, an air flow turbine 95 having an air inlet 96 and a suction outlet 97 communicating therewith may be provided for automatic operation of a generator 98 for charging a battery 99 which operates the electrical system. It is believed manifest that other means for supplying electric current to the electrical system may be provided, if desired. Likewise, it is believed manifest that the electrical system may be used to operate the servo-mechanism, instead of the hydraulic system which has been described.

It is also believed manifest that the nose valve member 27 may be operated to be moved to the retracted open position shown in Figure 5 by pressure of air acting against the area of the valve member exposed through the opening 11, for automatically converting from rocket to ram-jet propulsion. Likewise, the nose valve member may be moved to the closed position shown in Figure 1 when the pressure acting across the full area of the nose member while in the open position is reduced by a predetermined amount.

From the foregoing, it will be seen that a power plant convertible from rocket to ram-jet propulsion, or from ram-jet to rocket propulsion, while in flight has been provided, such power plant being designed for automatic conversion from one stage of operation to the other, depending upon the speed of movement of the power plant through the air. Also, the operation of the power plant may be controlled by remote means by the operator of an aircraft on which it is mounted.

It will also be particularly noted that a novel valve or control means has been provided for controlling the inlet of the tubular power plant for controlling admission of air to the combustion chamber, and thereby controlling the conversion of the power plant from rocket to ram-jet propulsion or from ram-jet to rocket propulsion; and that such valve control means is operable automatically by air flow or pressure or both.

It will be particularly noted that the power plant is adapted for use as an engine in an aircraft operating in the ram-jet stage, to provide means for maintaining flight of the aircraft should a "flame-out" occur while the aircraft is in flight in the ram-jet stage, such power plant being provided with means for automatically converting from ram-jet propulsion to rocket propulsion in the event of loss of speed after the flame-out. It will thus be seen that after a flame-out has occurred, the speed of the aircraft may be increased sufficiently by rocket propulsion to permit resumption of ram-jet propulsion.

The foregoing description of the invention is explanatory only, and changes in the details of the method described and of the construction illustrated may be made by those skilled in the art, within the scope of the appended claims, without departing from the spirit of the invention.

What I claim and desire to secure by Letters Patent is:

1. A power plant convertible from rocket to ram-jet stage and from ram-jet to rocket stage and including: an elongated body having a combustion chamber therein with an outlet from said combustion chamber at the rear of said body, said body also having a flow passageway from the forward end of the body communicating with the combustion chamber; a nose valve member disposed in said passageway and movable to a position opening said passageway and to a position closing said passageway to control flow of air therethrough to said combustion chamber; means for moving said nose valve member selectively to either of said positions; second means in the body movable to a position separating the combustion chamber from the flow passageway and to a position permitting communication between said flow passageway and said combustion chamber; fuel supply means in said body; said second means being movable to the separating position by the pressure resulting from the combustion of fuel and oxidant in the combustion chamber when the nose valve member is closed and movable to position permitting flow of air from the passageway to the combustion chamber by the pressure of the air flowing through said passage when the nose valve member is in the open position; means for conducting fuel from said supply means to said combustion chamber; means for conducting an oxidant to said combustion chamber; and means operable in response to the movement of the nose valve member for controlling flow of oxidant through said oxidant conducting means.

2. A power plant of the character set forth in claim 1, including: means responsive to predetermined conditions of pressure for automatically selectively moving said nose valve member to positions opening and closing the flow passageway through the body; and means responsive to the movement of said nose valve member for actuating said oxidant flow controlling means to provide for flow of oxidant to the combustion chamber when the nose valve member is closed and to shut off such flow when said nose valve member is open.

3. A power plant convertible from rocket to ram-jet stage and from ram-jet to rocket stage and including: an elongated body having a combustion chamber therein with an outlet from said combustion chamber at the rear of said body, said body also having a flow passageway from the forward end of the body communicating with the combustion chamber; a nose valve member disposed in said passageway and movable to a position opening said passageway and to a position closing said passageway to control flow of air therethrough to said combustion chamber; means for moving said nose valve member selectively to either of said positions; second means in said body movable to a position separating the combustion chamber from the flow passageway and to a position permitting communication between said flow passageway and said combustion chamber; fuel supply means and means for conducting fuel from said fuel supply means to said combustion chamber; an oxidant supply means; means for conducting such oxidant from said supply means to said combustion chamber; valve means for controlling flow of oxidant through said conducting means; and means actuated by the movement of the nose valve member for controlling said valve means to control flow of oxidant through said oxidant conducting means to said combustion chamber to provide for flow of oxidant to the combustion chamber when the nose valve member is closed and to shut off such flow of oxidant when said nose valve member is open.

References Cited in the file of this patent

UNITED STATES PATENTS

| | | |
|---|---|---|
| 2,446,266 | Cummings | Aug. 3, 1948 |
| 2,609,660 | Tenney et al. | Sept. 9, 1952 |
| 2,638,738 | Salter | May 19, 1953 |
| 2,658,331 | Johnson | Nov. 10, 1953 |
| 2,677,232 | Collins | May 4, 1954 |
| 2,716,329 | Lunger | Aug. 30, 1955 |

FOREIGN PATENTS

| | | |
|---|---|---|
| 590,177 | Great Britain | July 10, 1947 |
| 669,008 | Great Britain | Mar. 26, 1952 |